United States Patent [19]

Coucher et al.

[11] 3,913,795

[45] Oct. 21, 1975

[54] PULSATING POWDER METERING AND DISPENSING DEVICE

[75] Inventors: Robert G. Coucher, Salt Lake City; Edward Taylor, Hunter, both of Utah

[73] Assignee: EPPCO, Salt Lake City, Utah

[22] Filed: July 29, 1974

[21] Appl. No.: 492,498

[52] U.S. Cl. .............................. 222/194; 222/381
[51] Int. Cl.[2] .......................................... B67D 5/54
[58] Field of Search ............ 222/194, 193, 381, 373

[56] References Cited
UNITED STATES PATENTS

| | | | |
|---|---|---|---|
| 1,795,236 | 3/1931 | Schupp | 222/381 X |
| 3,281,022 | 10/1966 | Jarnett | 222/194 |
| 3,797,709 | 3/1974 | Ivanovich | 222/194 |

*Primary Examiner*—Stanley H. Tollberg
*Attorney, Agent, or Firm*—Trask & Britt

[57] ABSTRACT

A pulsating powder metering and dispensing device is disclosed whereby reproducible quanta of particulate matter are intermittently ejected over a preselected time frame. The pulsating device includes a powder reservoir having a pressure actuated, normally constricted outlet in one end thereof. An open ended metering chamber is mounted in opposed relation to the normally constricted outlet for piston-like reciprocating movement through the powder contained within the reservoir. As the metering chamber penetrates and enters the powder reservoir, a reproducible amount of powder is collected within the chamber. The penetrating stroke is completed when it moves into registry and mates with the normally constricted outlet. A pressurized gas is introduced into the other end of the open ended metering chamber, forcing the powder against the normally constricted outlet with a force sufficient to open same. The pressurized gas and powder pass from the metering chamber through the normally constricted outlet and out through a nozzle connected thereto. After the powder has been ejected, the metering chamber is reciprocatively withdrawn to its initial starting position. Reciprocation of the metering chamber is preferably accomplished by pneumatic means. Additionally, the powder metering device is adapted with a powder redistribution system for agitating the powder and thereby refilling the voids created by the withdrawal of the metering chamber. The above described pulsating powder metering and dispensing device has special utility in the field of powder spraying and coating of substrates.

25 Claims, 12 Drawing Figures

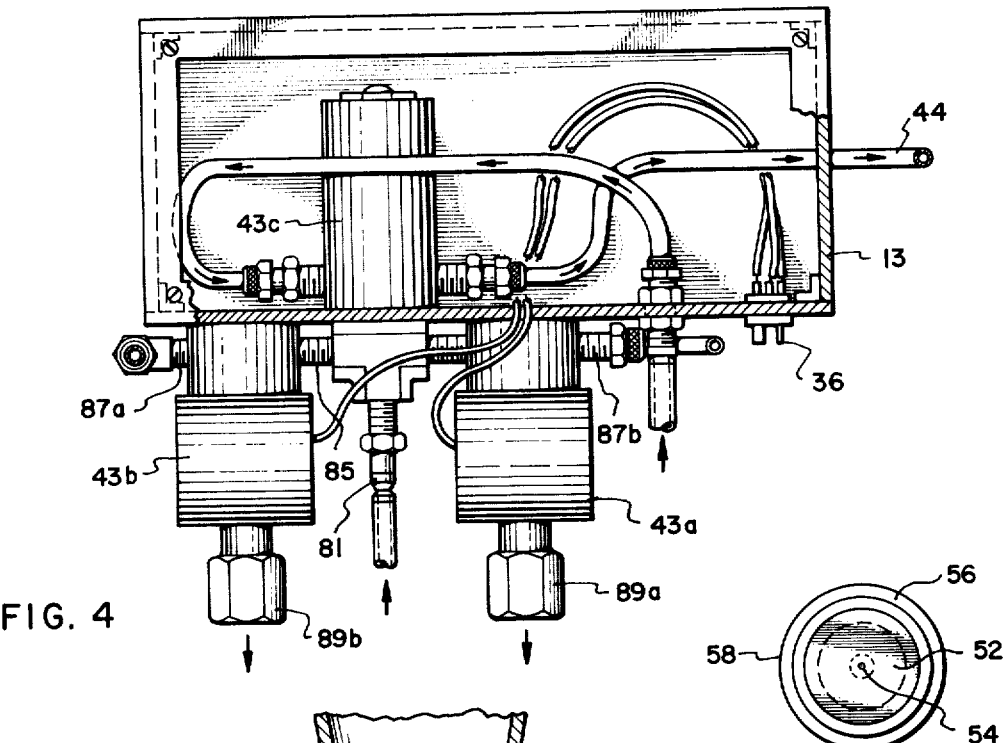
FIG. 4
FIG. 10
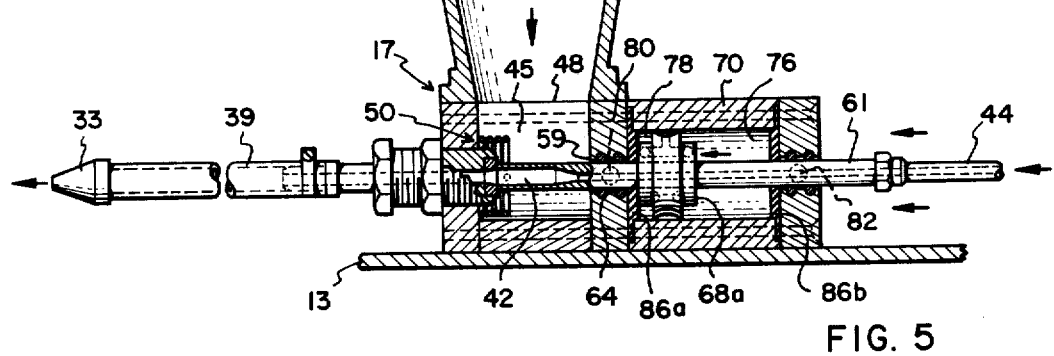
FIG. 5
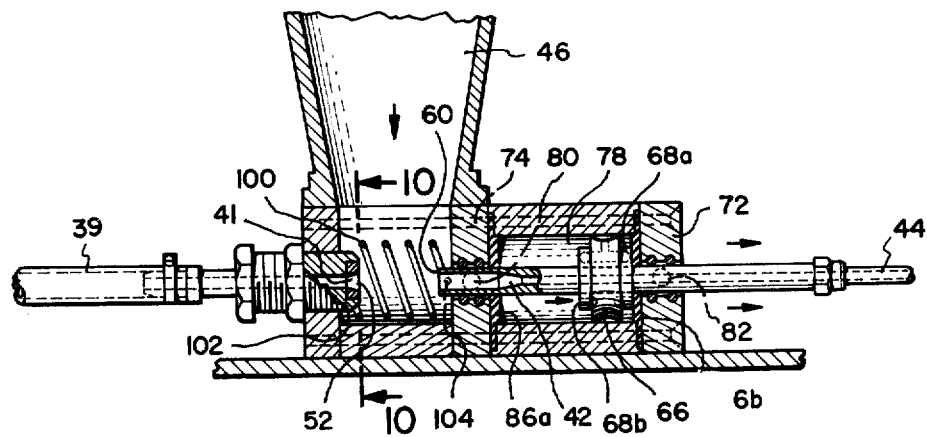
FIG. 6

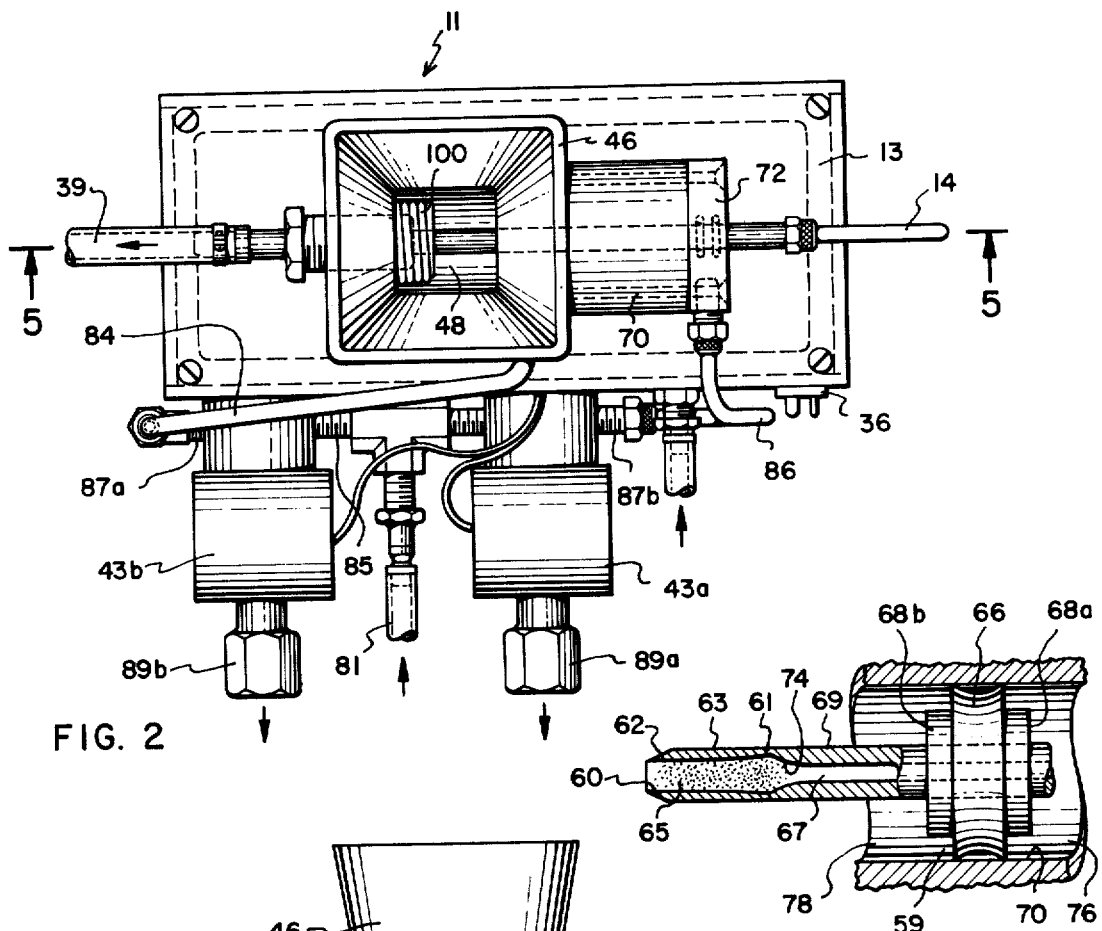
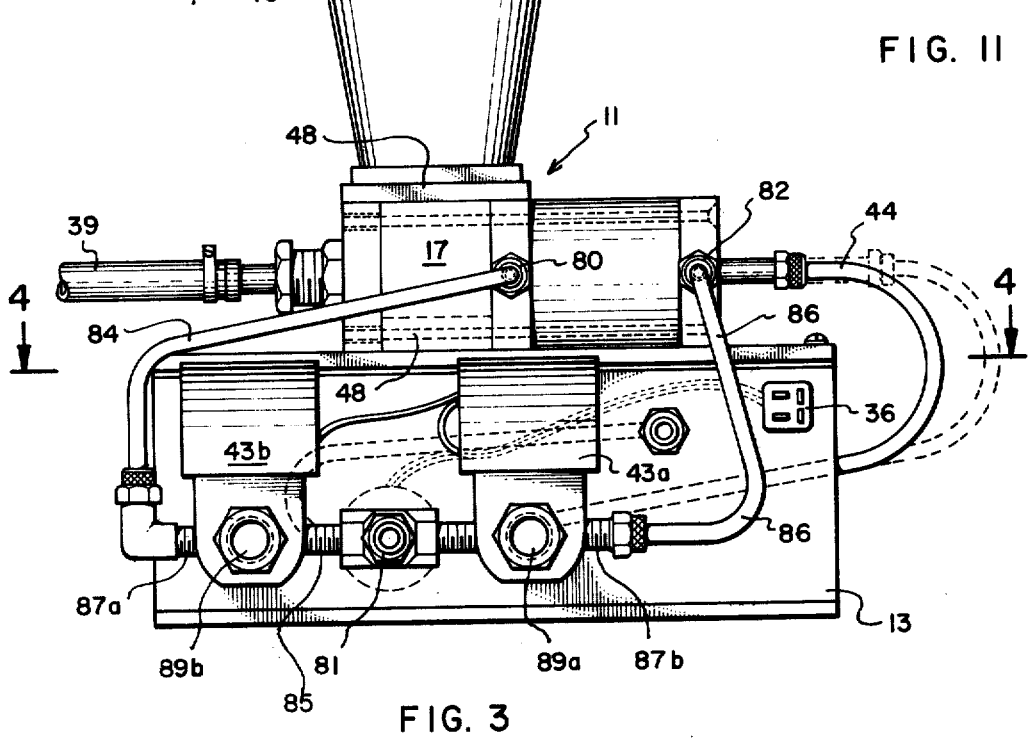
FIG. 2
FIG. 11
FIG. 3

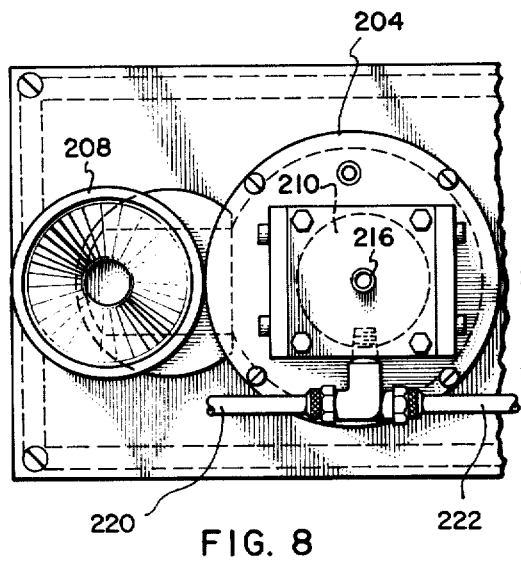
FIG. 8
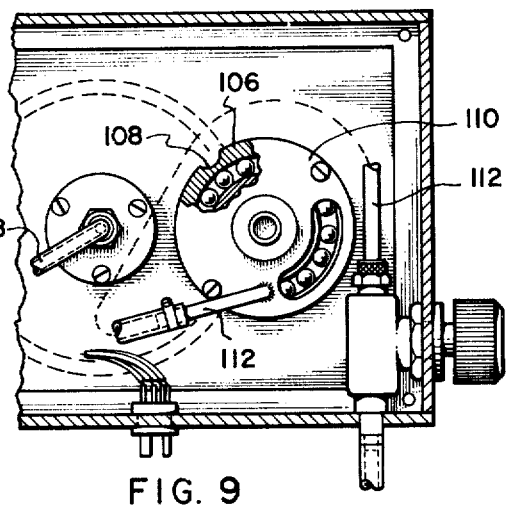
FIG. 9
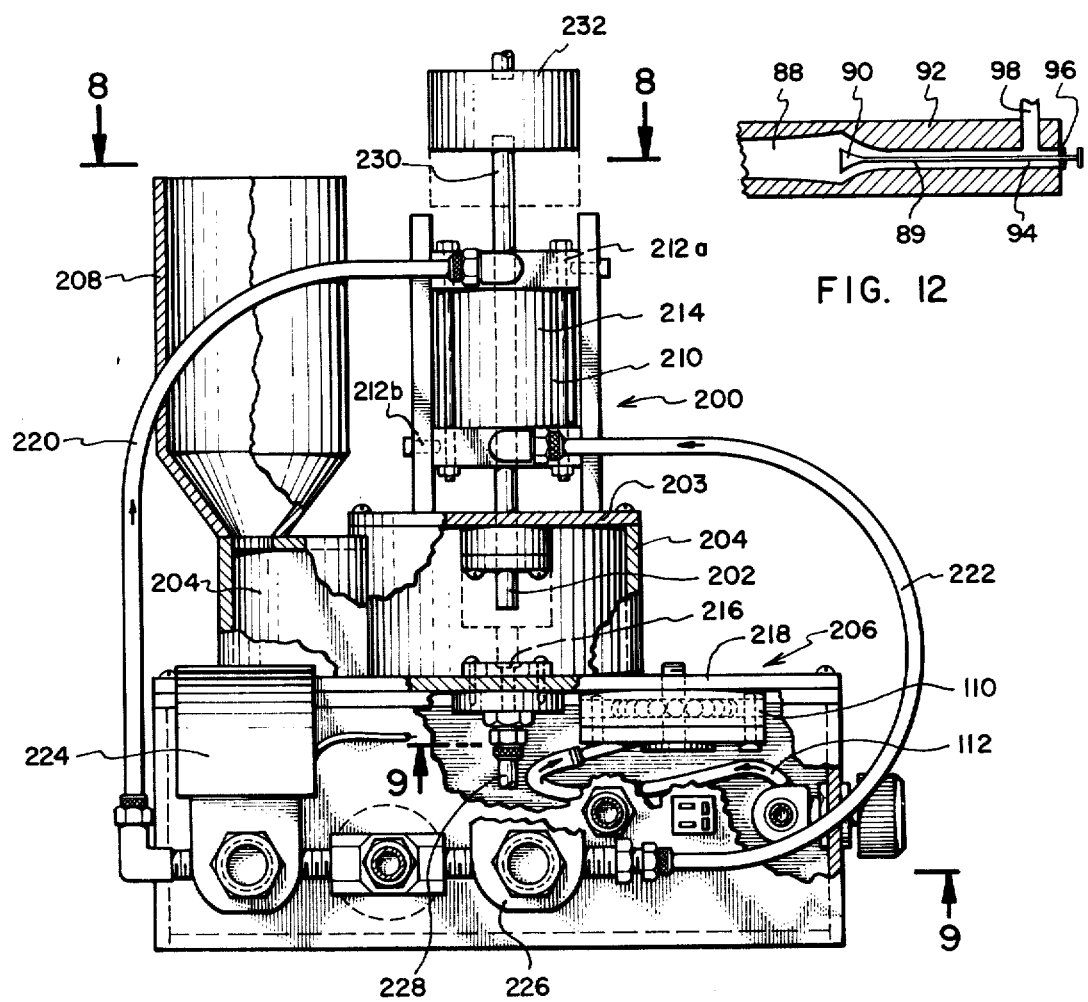
FIG. 7
FIG. 12

PULSATING POWDER METERING AND DISPENSING DEVICE

BACKGROUND OF THE INVENTION

1. Field:

This invention is directed to powder metering devices and particularly to intermittent or pulsating powder metering devices capable of dispensing discrete and reproducible quanta of powder.

2. State of the Art:

The prior art has suggested various types of powder dispensing devices capable of collecting discrete quantities of powder from a reservoir and transferring such quantities to another zone or area. In most of the above devices, a series of spaced apart cavities are filled by means of an overhead hopper. The filled cavities are then moved into registry with a pressurized air or vacuum source and the powders collected within the cavities are removed therefrom. With the above system, the cavities are normally carried on a rotating disk with a second stationary disk mounted proximally thereto. The stationary disk contains a series of ports for selectively exposing the filled cavities to a zone of positive or negative pressure. With most powders, the above described system is, for the most part, satisfactory. However, if an abrasive or a fine, thermosetting powder is to be transferred via the powder dispensing device, care must be taken to prevent some of the powder from working itself in between the face-to-face disks. The reason is that as the disks are rotated, a certain amount of frictional heat is generated which will cause the thermosetting powders to melt and, upon cooling, set, making rotation of the disks extremely difficult if not impossible. If abrasive powders pass in between the disks, the disks caan become marred and cause operational difficulties.

In other powder dispensing devices wherein powder filled cavities are not employed, difficulties have been encountered in transmitting discrete, reproducible amounts of particulate matter over a preselected time span. Particular difficulties have been encountered in ejecting reproducible amounts of powder over relatively short, intermittent periods of time. For example, no system is currently known which is capable of delivering at least sixty pulses or bursts per minute of reproducible quanta (plus or minus ten percent) of powder. Powder dispensing systems which have approximated the above delivery rates are extremely complicated and are difficult to maintain in reliable working condition.

In view of the above problems, it is a primary object of this invention to provide a powder metering and dispensing device capable of delivering reproducible quanta of powder on a repetitive basis. Another object is to provide a powder metering device which does not require the use of rotating disks and thereby does not create frictional heat which can hamper its operation, particularly when such powders are of the thermosetting variety. Still another object is to provide a powder metering and dispensing device which can be manufactured economically and requires a minimum, if any, maintenance or down time. Another object is to provide a powder metering device which has the versatility of being connected to a nozzle and used for ejecting discrete and reproducible amounts of powder on a substrate on a controlled intermittent basis. Still another object of this invention is to provide a method and device for coating the internal walls of a cylindrical container.

SUMMARY OF THE INVENTION

The above and other objects of this invention are achieved by the pulsating powder metering and dispensing device of this invention which broadly includes a powder reservoir adapted with a normally constricted outlet. (Hereinafter the pulsating powder metering and dispensing device may on occasion be referred to as the "powder feeding device.") An open ended metering chamber is reciprocally mounted through an opening in the wall of the powder reservoir. A means is also provided to reciprocatively move the metering chamber so that one of its open ends passes through the powder contained in the reservoir and, at the end of its inward or penetrating stroke, to register with the normally constricted opening contained in the reservoir. As the metering chamber passes through the powder towards the normally constricted outlet, a discrete quantum of the powder is collected therein. A pulse of pressurized gas is then introduced into the other end of the metering chamber, forcing the powder against the normally constricted outlet. The force exerted against the outlet is sufficient to force the outlet into an expanded or open position, allowing the gas and powder to pass therethrough into an outlet line and nozzle affixed thereto for distribution at a remote point of use.

With the above powder feeding device, discrete quanta of powder can be intermittently ejected for use in, for example, coating substrates of unusual configurations. The amount of powder ejected can be varied by inserting plugs or sleeves into the powder metering chamber. The volume of pressurized fluid can also be controlled to alter the ratio of air to powder and to vary the velocity at which the powder is ejected. To avoid the ejection of a compressed slug of powder from the powder metering chamber, a surge or mixing chamber can be inserted between the normally constricted outlet and the nozzle. This arrangement permits the pressurized gas to expand momentarily and thereby cause the powder to become dispersed and commingled more completely with the gas prior to ejection from the nozzle. In effect, the surge tank or mixing chamber increases the time interval over which the powder is being dispersed.

BRIEF DESCRIPTION OF THE DRAWINGS

FIG. 2 is a top view of one embodiment of this invention wherein the metering chamber of the pulsating powder metering and dispensing device is mounted in a plane horizontal thereto;

FIG. 3 is a side view of the pulsating powder metering and dispensing device shown in FIG. 2 with parts shown in phantom for clarity;

FIG. 4 is a top cut-away view of the pulsating powder metering and dispensing device shown in FIG. 3 taken along line 4—4;

FIG. 5 is a side cross section taken along line 5—5 of FIG. 2 with the metering chamber in a fully extended position;

FIG. 6 is a side cross section similar to FIG. 5 with the exception that the metering chamber is in a retracted or withdrawn position;

FIG. 7 is a side elevation with parts broken away for clarity of a powder metering and dispensing device wherein the metering chamber is mounted in a plane vertical thereto;

FIG. 8 is a top view taken along line 8—8 of the device shown in FIG. 7;

FIG. 9 is a view taken along line 9—9 of the device shown in FIG. 7;

FIG. 10 is a front elevation of the normally constricted outlet incorporated in FIGS. 1–6;

FIG. 11 is a side cross section of a piston connected powder metering chamber; and FIG. 12 is a side cross sectional view of a powder metering chamber adapted with a stem valve for controling pressurized air flow.

DESCRIPTION OF THE PREFERRED EMBODIMENT

Figure 1:
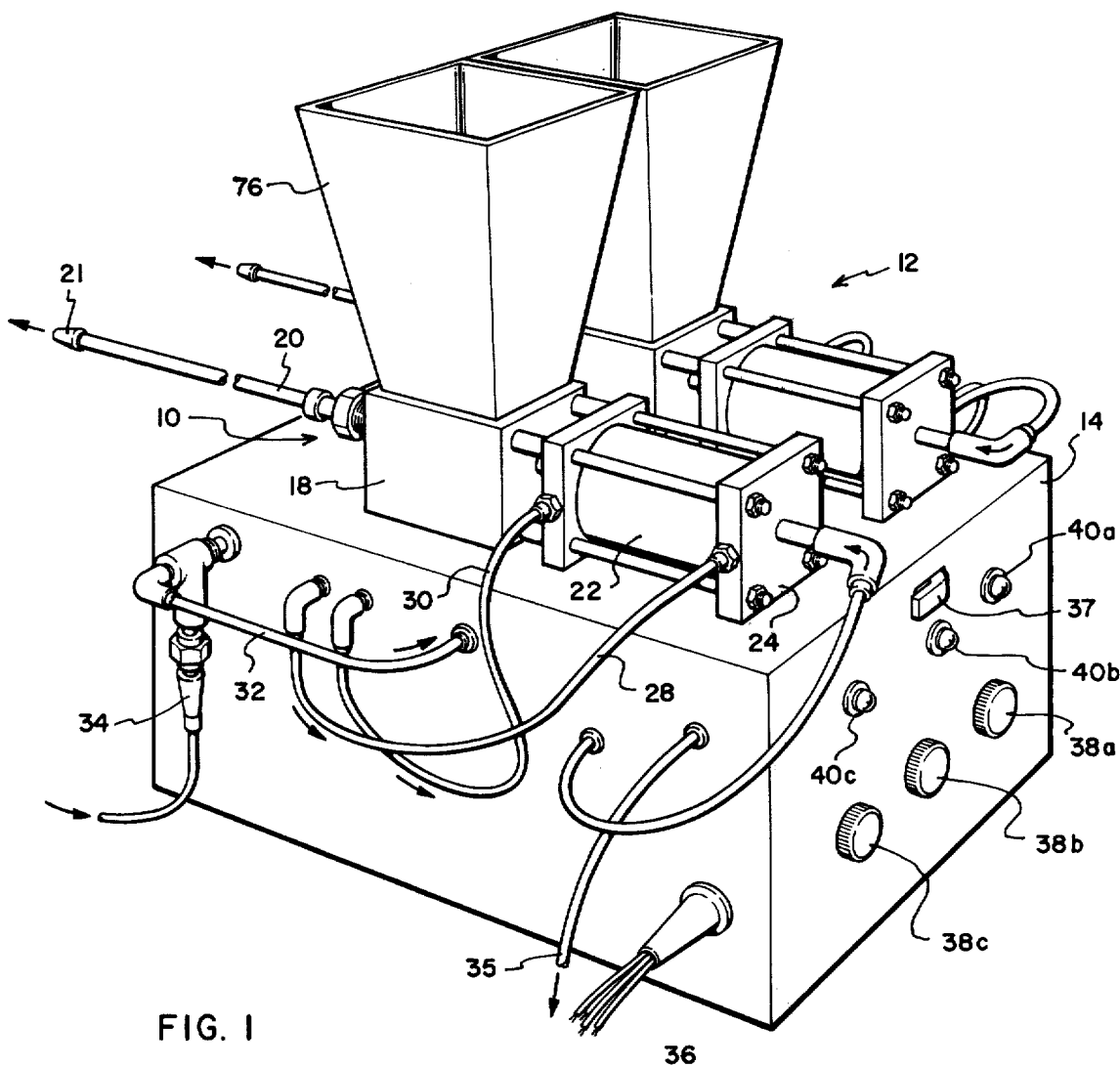
FIG. 1 is a three dimensional view of a pulsating powder feeding system wherein a pair of identical pulsating powder feeders are adjacently mounted.

In FIG. 1 a pulsating powder metering and dispensing system is shown in which a pair of pulsating powder feeders 10 and 12, respectively, are horizontally mounted on a support housing 14. The interior of the housing contains various electrical and pneumatic accessories (solenoids) necessary for actuating and sequentially operating the powder feeders. Since the two powder feeders depicted are essentially identical in all regards, only one of the pulsating powder feeders will be detailed in the description that follows. However, it should be recognized that any number of pulsating powder feeders can be carried on a single support housing.

As shown, the pulsating powder feeder includes a hopper 16 opening into a powder reservoir 18 having an adapted outlet line 20 and nozzle 21 attached thereto. In opposed relation to the outlet line is a horizontally positioned cylindrical housing 22 supported by channeled end blocks 24 and 26. The end blocks contain internal ports and channels adapted for receiving pressurized air inlet lines 28 and 30 which in turn are connected to a pair of solenoids (within the housing 14) and a pressurized air source (not shown) via adapted inlet line 34. A portion of the pressurized air introduced therein actuates the powder metering chamber (not seen) carried with the cylindrical housing 22 to reciprocatively move within the powder reservoir 18 on command. The powder collected within the metering chamber, during reciprocation, is ejected by means of a pulse of pressurized air introduced through a solenoid container within the housing 14 via inlet line 32. Bleeding of the end blocks and the metering chamber is achieved through an internally connected outlet line 35. Electrical power is supplied to the powder metering system by means of an electrical input line 36 and controlled by an on-off switch 37. Controls 38a, 38b and 38c are provided in the electrical circuit to vary pulse duration, piston speed and firing intervals between each of the powder feeders respectively. The pulse duration, firing times, etc. of the metering chamber can be visually monitored by control lights 40a, 40b annd 40c as they occur.

A more specific description of a particular embodiment of a powder metering and dispensing device anad its operation will now follow. It should be noted that this device and its operation will now follow. It should be noted that this device will differ structurally, to some degree, with the device depicted in FIG. 1. However, the principle of operation is the same.

Referring now to the drawings, and particularly to FIGS. 2 through 6, inclusive, the pulsating powder metering and dispensing device of this invention is identified generally by numeral 11. In this device the powder metering chamber moves reciprocatively in a horizontal plane.

As illustrated, the device comprises generally a powder reservoir 17 for holding pulverulent materials having either free flowing or conglomerating characteristics. At a point below the powder's upper level, a normally constricted powder outlet port 41 (FIG. 6) is provided. Except for brief periods during which a positive pressure is exerted on the outlet port, the outlet port is designed to be maintained in either a closed or constricted position; that is, the opening in the port is sufficiently constricted so that substantial amounts of powder cannot escape therethrough under normal ambient pressure conditions. The degree or types of constriction will be governed by the nature and size of the powders contained in the powder reservoir.

An open ended metering chamber 42 is reciprocatively mounted to penetrate one section or one wall of the reservoir and when extended within the reservoir will traverse the reservoir and register with the normally constricted outlet 41 carried by the powder reservoir. A solenoid identified generally by numeral 43a is provided for releasing a pulse of pressurized air which in turn forces the metering chamber through the powder contained in the reservoir and into registry with the normally constricted outlet. The metering chamber is withdrawn by a second pulse of air released by solenoid 43b. The metering chamber reciprocating means (solenoids) is actuated by a signal transmitted manually by an operator or automatically by an electrical timing system contained within the support housing 14. The timing system is designed to transmit intermittent electronic signals to each of the solenoids, causing the solenoids to open and release a pulse of pressurized gas for driving the powder metering chamber. A third solenoid 43c releases another pulse of air which forces the powder collected within the powder metering chamber outwardly through a nozzle 33 connected to an outlet line 39. The pressurized air is introduced into one end of the powder metering chamber through line 44 which in turn is connected to the solenoid 43c. Upon actuation of the solenoid 43c, as by an electrical impulse, a pulse of pressurized air is introduced into the chamber, forcing the powder against the normally constricted opening. The force exerted is sufficient to urge the constricted opening into an open position and thereby permit the gas and powder to pass therethrough. Upon passage of the gas pulse and powder, the opening will automatically close or constrict to its normal position, readying the system for subsequent pulsing actions.

Powder Reservoir

The powder reservoir identified generally by numeral 17 includes a powder chamber 45 mounted to an enclosed support housing 13. A hopper 46 is carried on top of the powder chamber 45 and is in communication therewith through a bottom opening 48. The particulate matter or powder can be introduced into the hopper by any known means. An enclosed powder feeder device such as that disclosed and claimed in U.S. Pat. application Ser. No. 223,969 filed on Feb. 7, 1972 is preferably used. However, other conveying or transporting systems such as enclosed pneumatic lines, conveyors and the like may be used.

Although an open hopper is depicted in the drawings, a closed system can also be employed. For example, the hopper can be adapted with a cover, a vent opening and a recycling system. Powder would be continuously conveyed to the reservoir by means of a line leading from a powder source. Any excess powder would be returned via a recycling oystem. A suitable closed system with recycle is described in U.S. Pat. application Ser. No. 430,721 filed on Jan. 10, 1974.

The powder dispersed by the device of this invention can be free flowing, that is, it has flow characteristics similar to that of a liquid. As a result, the powder will normally seek its own level in the powder reservoir. However, one of the advantages of this invention is that it is also capable of handling powders having a small particle size and which possess conglomerating characteristics such as that exhibited by talc. To insure that the powder reservoir is maintained full, a distributing or agitating means shown generally by numeral 50 is also provided. The agitating means may be located within the powder reservoir or externally thereof depending upon the type of agitating system employed. A more complete description of the agitating system will subsequently follow.

As earlier indicated, one of the walls of the powder reservoir contains a normally constricted opening or outlet 41 through which discrete quanta of powder are removed. In one embodiment of this invention (FIG. 10), the normally constricted opening comprises an expandable diaphragm 52 having a pinpoint hole 54 positioned centrally therein. The diaphragm is held in position against the wall of the reservoir by means of a locking nut and ring 56. About the ring and opening, a resilient seal such as an O ring 58 is positioned to contactually receive the outlet end of the metering chamber which will hereinafter be described in more complete detail. The resilient seal is of sufficient resiliency and thickness so that on mating with the outer end 60 of the metering chamber, no powder can enter or escape from the metering chamber. If the seal is imperfect or incomplete, a stream of pressurized air will escape into the reservoir and can cause a blow back action of the powder contained therein and possible also permit some of the powder collected within the metering chamber to escape into the reservoir. This could seriously hamper the device's ability to meter and dispense reproducible quanta of powder.

The expandable diaphragm 52 is of sufficient thickness and resilience to permit expansion thereof when a pulse of pressurized air is introduced against the diaphragm. As the air pressure forces the diaphragm into an expandable condition, the pinpoint aperture 54 contained therein is likewise expanded (shown by dotted circle in FIG. 10), permitting the opening to increase in size such that the powder and air can pass uninhibited therethrough. In the embodiment shown, the normally constricted outlet has a size, when closed, of about 0.005 inch and when expanded or opened has a size of about 0.125 inch.

Although an expandable diaphragm is depicted in the attached drawings, other closing or constricting means may also be used. For example, a ball type check valve biased to a normally closed position may be used. Pressure actuated solenoids or even a hinged flap biased to a normally closed position may also be used. Preferably a system will be empolyed which will insure unobstructed and reliable closing onn a regular and repetitive basis. Further, the system should be designed to minimize if not prevent undesirable losses of powder from the reservoir when the powder metering chamber is under a positive pressure which may exceed 25 psi gauge, although a pressure of between 2.0 and 5.0 psi gauge is normally used. Other constricting or closing devices such as an upwardly bent tubular outlet producing a tortuous path which would inhibit the normal flow of powder may be used in particular situations.

At a point opposite to the normally constricted opening, the powder reservoir is provided with a second opening 59 through which the reciprocating metering chamber, hereinbefore mentioned, is carried. The area about the second opening, which receives and supports the reciprocating metering chamber, is provided with one or more O rings 64 or with a friction reducing sleeve comprising teflon or teflon impregnated with molybdenumdisulfide.

Another technique for preventing the powder from escaping through the second opening is to attach one end of a bellows cover around the opening and the other end around the reciprocating metering chamber. Reciprocation of the metering chamber will extend and collapse the bellows cover and prevent escape of any of the powder through the second opening.

Since the reservoir is generally maintained at atmospheric pressures, the sealing system does not pose any major difficulty as the primary purpose of the seal is to prevent losses of powder from the reservoir during reciprocation of the metering chamber. However, if small amounts of the powder do manage to pass from the reservoir to an area outside thereof, such powders can be conveniently collected and recycled to the reservoir for reuse.

Metering Chamber

The metering chamber 42 disclosed herein comprises an open ended tubular member 61 (See FIG. 11) reciprocatively mounted so that one end thereof will pass through and slideably move within the second opening 59 in a wall of the powder reservoir 17. The other end of the tubular member is circumscribed in part by a piston 66 bounded by a pair of spaced apart stepdown collars 68a and 68b. The piston is slideably contained within a cylinder housing 70 having its ends closed by end plates or blocks 72 and 74 (FIG. 6). These end plates correspond to the end blocks 24 and 26 shown in FIG. 1. The piston is slideably moved within the cylinder by the introduction of pulses of pressurized air into one of two air receiving chambers 76 and 78, respectively, located on each side of the piston 66 and formed by the cylinder walls, the piston and collars. The pulses of pressurized air are introduced into each of the air receiving chambers 76 and 78 sequentially via communicating ports 80 and 82 and air supply lines 84 and 86. The pressurized air pulses are generated by the momentary opening of solenoids 43a and 43b connected to a pressurized air source (not shown). The impact of the sliding piston against the end blocks 72 and 74 is absorbed by end cushions 86a and 86b mounted internally to the face of end blocks 74 and 72, respectively.

The distance the metering chamber moves within the powder reservoir is controlled in part by the collars 68, the cushions 86a and 86b and by the amount of air introduced into the air receiving chambers. The piston 66 and tubular member 61 are of such length that the tube's open end 60 will mate or register with the O ring 58 circumscribing the normally constricted opening 41. As the metering chamber knifes through the powder contained within the powder reservoir, a reproducible amount of powder enters the open end of the metering chamber. It has been surprisingly found that the powder separated from the reservoir and collected within the chamber is of such constant and reproducible quanta that the margin of error is less than 15 percent and in many cases less than 8 percent. The above margin of error was empirically determined by collecting a number of different sized samples in which each sample weighed between 100 and 400 milligrams. It was found during these tests that the reproducible factor could be still further improved by incorporating a powder redistribution means into the powder metering system. This powder redistribution means provides a means whereby the voids created in the powder reservoir by withdrawal of the powder metering chamber are replaced with an amount of powder equivalent to that removed. This improves substantially the device's reproducible metering capabilities.

The other end of the metering chamber is connected to aa pressurized air line 44 through which a predetermined amount or pulse of pressurized gas such as air is carried. Preferably the gas pulses are introduced under a pressure of between about 10 – 250 psi gauge and preferably between about 80 – 200 psi gauge. However, higher or lower pressures may be used in particular cases. A pressure of about 180 psi gauge is normally used.

As was earlier stated, the air introduced into the first air receiving chamber 76 forces the metering chamber through the powder and into registry with the normally constricted opening (FIG. 5). To withdraw the metering chamber, air is then introduced into the second air receiving chamber 78, forcing the metering chamber in the opposite direction to its open position as shown in FIG. 6. The air is introduced sequentially and is timed such that a third pulse of air is directed into the inlet line 44 when the metering chamber is in registry with the normally constricted opening. The pressurized gas forces the powder contained in the metering chamber through the normally constricted opening and out through the outlet line 39.

The pressurized gas lines 84 and 86 are in turn connected to individual electrically actuated solenoids 43a and 43b. When a first electrical signal is transmitted to the solenoid 43b, the solenoid 43b in response thereto opens for a period of time varying in length from 100 to several thousand microseconds. The amount of time the solenoid is open will, of course, determine the amount of air which will be introduced into the air receiving chamber. A third solenoid 43c controls in like manner the amount of air entering the powder metering chamber. Since the length of time the solenoid is open determines the amount of air introduced into each of the air receiving chambers, the length of the stroke of the metering chamber can likewise be controlled. This capability permits varying amounts of powder to be collected within the chamber on its injection or inward stroke by varying the distance the metering chamber will travel through the powder. The amount of powder collected within the metering chamber can also be varied by introducing plugs or sleeves into the metering chamber. By so doing, the internal volume of the collecting metering chamber is reduced which in turn reduces the amount of powder collected therein.

In the embodiment shown (See FIG. 11), the inner diameter of the powder collecting chamber 65 of the reciprocating tubular member 61 is frustum shaped; that is, it gradually increases in cross sectional area before the powder collecting chamber is terminated by a reducing shoulder 69. The shoulder 69 constricts the tubular member to a substantially smaller cross sectional area. This portion of the tubular member functions as a conduit for carrying the pressurized gas introduced therein. The use of a frustum shaped powder collecting chamber minimizes a powder back pressure build up during the collecting process and thereby prevents powder composition within the powder metering chamber. The shoulder 69 which separates the powder collecting chamber 65 from the conduit portion 67 of the tubular member 61, also operates as a barrier which limits the amount of powder 63 that can be collected therein.

The outer end 60 of the metering chamber 42 is slightly tapered 62 to insure a close fit of the metering chamber against the resilient seal 58 surrounding the normally constrictdd outlet. If desired, other configurations can, of course, be employed depending upon the type and design of seal employed. In many instances the end of the metering chamber can be blunt to slightly rounded to insure a close fit against the resilient seal.

Since the powder metering and dispensing device of this invention is normally operated at a constant pressure, the flow of gas introduced into the metering chamber can be altered by varying the size of the opening leading into the metering chamber. This can be accomplished by a conventional valving means or by the valve system shown in FIG. 12. In this case the metering chamber 88 is adapted to receive a longstemmed valve 89 having a conically shaped head 90 mounted at one end thereof. The conically shaped head is designed to constrict the entrance way between the air conduit chamber 94 and the metering chamber 88 of the reciprocating tube 92. The constricting conical head can be moved by longitudinal displacement of the stem (as by rotating the threaded end 96) and thereby vary the opening leading into the powder metering chamber. This feature permits the flow of air to be varied by varying the constriction of the throat leading into the powder metering chamber. In addition to controling the gas flow, the head 90 also functions as a barrier to prevent powder from entering the air conduit chamber 94. In the above embodiment, pressurized air would be introduced into the powder metering chamber through side conduit 98.

The reciprocating tube which enters the powder reservoir can be positioned at any angle between vertical and horizontal. The position of the reciprocating tube is not critical as is the position of the normally constricted outlet. In FIGS. 1 through 6, inclusive, the powder metering chamber is positioned in a plane substantially horizontal to the support housing. In FIGS. 7 through 9, inclusive, the powder metering chamber is positioned in a plane substantially vertical to the support housing. In some cases, the chemical and physical properties of the powder being metered and dispensed will determine the position of the metering chamber.

Personal choice or preference is also a factor. Any position between vertical and horizontal may be used as long as reproducible amounts of powder can be obtained.

As shown in FIGS. 7 - 9, the powder metering and dispensing device of this invention 200 incorporatess a powder metering chamber 202 carried in a plane vertical to the support housing. In this arrangement, a powder reservoir 204 is carried on a support housing 206. A hopper 208 is in open communication with the powder reservoir 204. A cylindrical housing 210 containing end blocks 212a and 212b is mounted atop the powder reservoir 204. An open ended tube 214 is mounted for reciprocal movement within the cylindrical housing 210 with one end thereof (metering chamber section 202) penetrating the top wall 203 of the powder reservoir 204. The metering chamber 202 is aligned such that it can mate (during its downward stroke) with a normally constricted opening 216 contained in the bottom wall 218 of the powder reservoir 204. The above reciprocating action is essentially identical with that of the horizontally positioned metering chamber earlier described and thus shall not be repeated. The arrangement of air inlet lines 220 and 222 through solenoids 224 and 226 controls the reciprocating movement of the powder metering chamber. Air inlet line 228 ejects the powder collected in the powder metering chamber through the top 230 of the tube 214. Preferably, the gas and powder ejected from tube 214 will pass into a surge tank 232 where the gas and powder are intermixed prior to entering the outlet line and a nozzle (not shown) connected thereto.

To insure that the powder will pass from the hopper 208 and into the powder reservoir 204, a powder distributing means comprising an off-balanced ball bearing race 110 rotated by a stream of pressurized air 112 (FIG. 9) is employed. The device shown in FIGS. 7 - 9 is operated in essentially the same manner as the horizontally positioned metering device earlier described.

Moving Means for Metering Chamber

In the embodiments shown, the powder metering means is actuated for a reciprocal movement by a pneumatic system in combiation with an electrically energized solenoid.

The solenoids 43a and 43b are of the standard type (See FIG. 3), having an air inlet port 81, a branch connecting line 85, outlet ports 87a and 87b connected to an outlet line 84 and 86, respectively, and venting ports 89a and 89b. A suitable type of solenoid is one which is commercially available under the trade name of ASCO Solenoids; however, spool solenoids of the type manufactured by NUMATICS, Inc. may also be used. Preferably the solenoids are connected in series such that the same air source can be used for supplying pressurized air to both solenoids. However, separate air sources may be used if desired. Pressurized air lines 84 and 86 lead from each of the solenoids to the first and second air receiving chamber 76 and 78 formed by the piston 66 and cylinder housing 70. Upon receiving an electrical signal, the solenoids are actuated and opened in a preselected order, permitting a pulse of pressurized air to enter sequentially the first and second air receiving chambers 76 and 78, forcing the metering chamber to reciprocatively move within the powder reservoir. The positions occupied by the metering chamber after each air firing is depicted in FIG. 5 (closed position) and FIG. 6 (open position).

Although a pneumatic system is shown for actuating the powder metering chamber, hydraulic or electrical systems can also be used. If an electrical system is to be used, the powder metering chamber would be encased within a wound armature which would then permit the powder metering chamber to function as a solenoid piston. Combinations of any of the above systems may also be used if so desired.

In the embodiment shown, the system is designed such that the air solenoids maintain the metering chamber in an extended position such that one end of the metering chamber is in engagement with the normally constricted opening. Upon actuation, the powder metering means is preferably withdrawn at a velocity such that a vacuum is created in the area vacated by the powder metering means. With the aid of the helical spring 100, the powder adjacent thereto will be sufficiently agitated to fill the void created by movement of the powder metering chamber. Within a short period of time thereafter, for example, from 100 to 500 microseconds, a second pulse of air is introduced into the air chamber surrounding the powder metering means, forcing it towards the constricted opening. While moving forward to an extended position, a reproducible amount of the powder contained within the powder reservoir is scooped into the open end of the powder metering chamber and held therein until a third pulse of air is introduced into the metering chamber. This third pulse of air propels the powder outward from the powder metering chamber and against the normally closed outlet at a pressure sufficient to open the outlet and carry the gas and powder outwardly through a nozzle attached thereto.

In still another variation of the tubular member which makes up the powder metering chamber, the powder metering chamber may be slidably carried within a cylindrical housing. As the metering chamber is withdrawn, it will function much like a syringe and thus will draw some powder into the cylindrical chamber and also into the metering chamber. The type of system employed will be determined by the type of powder dispensed, operating parameters, personal likes and dislikes, etc.

Powder Ejecting Means

The powder collected within the powder metering chamber is expelled by a pulse of air introduced into the chamber at a pressure of between 10 and 250 pounds psi gauge. The length of the pulse or the volume of pressurized air introduced into the chamber can be varied from over a relatively broad range. However, at a pressure of between 100 and 180 psi, an air pulse length ranging from 25 to 500 milliseconds, and preferably from 75 to 200 milliseconds, is normally used. The air ejecting pulse is generated by an electrical solenoid 43c (FIG. 4) of the type employed in reciprocating the powder metering chamber. Although a particular type of solenoid is shown and described, any means by which a controlled pulse of pressurized air can be introduced therein may be used.

Although air is the preferred gaseous material, other gaseous materials which would not have an adverse effect on the powder or on the substrate upon which the powder is deposited can be used. Gases such as nitrogen, helium and other substantially inert gases may be used if desired.

In addition to the pneumatic system, other means may also be used for ejecting the collected powder from the powder metering chamber. For example, a piston or even a liquid (instead of air) can be used to expel the powder if desired. It should also be recognized that a gas pressure of about 1000 pounds psi may also be used for expelling the powder from the powder metering chamber. In using the higher pressure gas, the volume of gas introduced therein can be reduced without substantially affecting the velocity at which the powder is expelled from the powder metering chamber. In most spraying or coating operations, the powder will normally be expelled at a velocity of between 3.0 feet per second (fps) to 900 fps, and preferably between about 100–700 fps. However, higher or lower velocities are readily adaptable to the powder feeding system of this invention.

Powder Distributing Means

When the powder is ejected from the powder metering chamber by a pulse of pressurized air, the powder has the potential of being distributed over a time frame equivalent to that of the air pulse. However, it has been found that in addition to compaction occuring during collection of the powder, that the powder will, in most cases, be compacted within the powder metering chamber by the pressurized gas prior to expulsion. When this phenomenon occurs, the powder is ejected as a compacted slug followed by a slug of air. Taking, for example, a situation where the air pulse extends over a period of about 200 milliseconds, the powder expulsion time may be substantially lower and may range over a period of between about 15 and 50 milliseconds. During the balance of time, substantially only air is being expelled. To remedy this problem, a powder distributing or redistribution means is provided to combine and mix the powder with the air. If the powder and air are completely commingled, the powder can be distributed over a time frame substantially equivalent to the length of the entire air pulse. To accomplish the above, the powder and air are first introduced into an expansion zone or chamber, such as a mixing chamber or a surge tank 232 (FIG. 7) before the air and powder mixture is introduced and ejected through a nozzle for deposition on a substrate. The step of commingling permits the powder to be ejected over a substantially longer distribution time. In other words, the powder will be more evenly distributed in the air so that the spraying time will be extended over substantially the entire air pulse.

If, for example, the internal walls of a container are to be coated, the container is first heated to a temperature slightly above the melting point of the powder contained in the powder reservoir. After the container has been preheated, it is subjected to a powder spray from the powder metering and dispensing device of this invention. To insure that a thin, substantially uniform coating is obtained, it is desirable to expose the internal walls of the container to a spray which will provide a multitude of thin coatings rather than a single relatively thick coating. This is achieved, in one instance, by commingling the powder with the air prior to ejection through the nozzle or, as stated above, by distributing the powder in the air such that the spraying time will be extended over the entire air pulse. This technique insures that a more uniform, multi-layered thin coating can be deposited on the container surface. With the device of this invention, it is not uncommon to obtain coating of between about 0.05 and 1.0 mils in thickness. Increased coating thicknesses can, of course, be obtained by increasing the amount of powder deposited on the container's wall or by repeating the coating process.

The quality of the coating is also dependent on the means by which the powder is distributed. For example, the type of nozzle employed plays an important part in the coating process. The nozzle used can vary depending on the spray pattern desired. The spray pattern, in turn, is dependent upon the configuration of the substrate being sprayed. In many instances, it may be desirable to utilize a pair of nozzles, as shown in FIG. 1, each having a spray pattern directed to accomplish a particular purpose. In a preferred embodiment, two nozzles may be used, one attached to each outlet of a powder feeding device or by having two nozzled outlets emanating from a single powder feeding device. It is also possible to supply two or more reciprocating powder metering chambers with powder from a common powder reservoir.

The devices above described are suitable for spraying or coating the internal walls of a container, wherein one nozzle is directed to spray a pattern designed for coating the dome and moat portion of the container while the second nozzle is designed for coating the longitudinal side walls. In each case, the means and mode of application can be varied to suit the design, size and shape of the substrate. For example, a single nozzle may be used having a spray pattern which is capable of spraying both the dome and moat portions of a container as well as its longitudinal side walls.

Powder Agitating Means

To insure that the powder density within the powder reservoir is maintained constant, that is, that the powder removed from the reservoir is replaced with a like amount, a powder agitating means is provided. In the embodiment shown in FIGS. 2 – 6, the powder agitating means comprises a helical spring 100 mounted at one of its ends 102 to the inner wall of the powder reservoir. The other end 104 of the spring is attached to the outer wall of the powder metering chamber. As the metering chamber is retracted, the helical spring attached to the metering chamber is expanded or stretched, causing a disruption of the powder in the immediate vicinity of the helical spring. The disruption is sufficiently complete such that the void in the powder reservoir created by withdrawal of the metering chamber is immediately refilled. By withdrawing the powder metering chamber at a high rate of speed, a vacuum is also created along the outer surface of the powder metering chamber. The presence of a vacuum in combination with the agitating means surrounding the powder metering chamber, provides a convenient and effective means for replacing the powder removed by the powder metering chamber.

The above system can be used with free flowing materials or with extremely fine particulate powders which tend to agglomerate. In the latter instance, sufficient disruption of the surrounding powders is achieved so that no significant cavities or voids remain unfilled after withdrawal of the metering chamber.

Under normal operating conditions, the variance in the amount of powder collected with the device of this invention will be no more than 10 percent and in most cases will approach a variance of less than 5.0 percent by weight.

Although a helical spring is shown, in the drawings, other agitating or spoiler means can be used. Thin pins and other spoiling appendages may be mounted on the outer wall of the powder metering chamber. Such appendages would disrupt and agitate the powder sufficiently to prevent the formation of cavities or pockets within the powder reservoir. The degree of agitation will depend to a large extent on the powder's physical and chemical properties; e.g., particle size, density, flow characteristics, etc. Highly hygroscopic powders, for example, would require a higher degree of agitation than a free flowing powder which is substantially non-hygroscopic. The degree of agitation should be matched with the characteristics of the powder.

Other means for achieving agitation of the powder can be achieved by fluidization. Fluidization may be achieved by introducing air through a porous plate positioned at the bottom of the reservoir or by applying a vibratory action to the powder reservoir. This can be achieved in many ways. An example of one approach is shown in FIG. 9. In this embodiment, a ball bearing race 106 is off-balanced by either removing a segment 108 of the race as shown in FIG. 9, or by the addition of weight to one side thereof. The raceway is rotated within the stationary ring 110 by introducing a stream of pressurized air through air line 112 against the ball bearing race 106. The speed of rotation of the raceway will generate a resonance frequency suitable for moving the free flowing powder contained within the reservoir. The resonance frequency can be increased or decreased by varying the velocity or intensity of air introduced against the raceway.

A tamping system (not shown) can also be used to provide the degree of agitation required. Repetitive tamping can be achieved by means of a biased hammer mounted to a revolving cam system. The purpose for any of the above powder agitating systems is to prevent pockets to be formed within the powder reservoir and thereby cause errors in collecting reproducible amounts of powder within the powder metering chamber. In addition, the agitating means insures that the number of particulates (powder density) will be the same throughout the powder reservoir and particularly that portion of the reservoir which is in the path of the reciprocating metering chamber. As long as the number of particulates remains relatively constant, the amount of powder collected within the powder metering chamber will likewise remain relatively constant.

Powder

The powder feeder of this invention is capable of dispensing pulverulent materials of all types. Most any inorganic material such as the metals and metal based compounds may be used. Examples of some of the many powders that may be used include powders dervied from metals, metal compounds such as the oxides or salts thereof, reagent materials such as catalysts, reactants, pharmaceuticals, enzymes and the like. In addition, various liquids and gases could be metered, using the basic principles herein described by making adaptations as may be required. The device of this invention is specifically designed to handle organic polymeric materials such as thermosetting and thermoplastic resins.

The powder used will generally have a particle size ranging from about 1 to 100 microns and preferably will have an average particle size of between 5 and 25 microns. One of the advantages of this invention is its ability to rapidly eject reproducible quanta of thermoplastic materials without incurring any breakdown or cause thermosetting of the material. As was previously indicated, the use of the prior art devices employing revolving disks containing metering cavities for collecting discrete quanta of powder generally created operational problems when thermosetting materials were used. Movement of one disk against the other created frictional heat which caused melting and eventual setting of the thermoplastic material trapped in between the faces of the two disks. In addition, the inadvertent melting of the thermoplastic material within the cavity would cause coating of its interior walls and thereby reduce the effective cavity volumes available for measuring reproducible quantities of powder for distribution. Since the metering device of this invention is substantially friction free, the problems encountered by the prior art are substantially avoided.

Method of Operation

The pulsating powder metering and feeding device of this invention can be effectively used for ejecting reproducible quanta of powder through a nozzle for deposition on, for example, a substrate such as the internal walls of a cylindrical container. This is achieved by filling the powder reservoir with a powder by any known means. For example, gravitational feeders, conveying systems and other transporting means may be used for providing powder to the reservoir. After the powder has been equally distributed therein, a pulse of pressurized air is introduced into one of the air receiving chambers. This forces the powder metering chamber through the powder and towards the normally closed outlet. The knifing movement of the powder metering chamber collects a quanta of powder within the chamber and thereafter mates or registers with the normally constricted opening. With the powder metering chamber in contact with the normally constricted opening, a second pulse of pressurized air is introduced into the other end of the powder metering chamber, forcing the powder against the normally closed outlet. The gas pressure is sufficient to force the normally closed outlet to an open position and expel both the powder and gas therethrough. The powder and gas are expelled through a nozzle in the form of a spray and deposited on a substrate positioned in close proximity thereto. Immediately after expulsion of the powder-gas mixture, the pressure within the chamber is reduced, causing the normally constricted outlet to return to its relaxed condition. A third pulse of air is then introduced into the second air receiving chamber, forcing the powder metering chamber to withdraw as depicted in FIG. 6. During reciprocation, the helical spring, attached at its ends to the wall of the reservoir and the powder metering chamber, is expanded causing agitation of the powder adjacent thereto.

In most coating operations, the above sequence will be repeated anywhere from 60 to 500 times per minute, depending upon the type of substrate being coated. Although the air pulsing sequence above described retains the powder metering chamber in an open position, the sequence can be altered so that the powder metering chamber is normally closed, that is, it is in contact with the normally constricted opening. In such a case the first pulse of air will withdraw the chamber to the position shown in FIG. 6 and immediately thereafter a second pulse will be introduced to force the metering chamber against the normally constricted opening as shown in FIG. 5. A third pulse of air will then be introduced into the powder metering chamber to expel the powder contained therein. The metering chamber will then be retained in a closed position until another pulse is introduced into the air chamber, forcing the powder metering chamber into an open position so that the above sequence can be repeated.

While the invention has been described with reference to specific embodiments, it should be understood that certain changes may be made by one skilled in the art and would not thereby depart from the spirit and scope of this invention which is limited only by the claims appended hereto.

We claim:

1. A powder metering and dispensing device comprising:
   a powder reservoir having a normally constricted openable outlet;
   an open ended metering chamber mounted for movement within said powder reservoir;
   means for moving said metering chamber through said powder reservoir and into registry with said normally constricted openable outlet; and
   means for introducing a pulse of pressurized fluid into said metering chamber, said pressurized fluid having a pressure sufficient to open said normally constricted openable outlet and to permit passage of said fluid therethrough.

2. The device of claim 1 wherein said normally constricted openable outlet is in communication with an outlet line having a nozzle attached thereto.

3. The device of claim 2 including a surge chamber interposed in the outlet line between the nozzle and said normally constricted openable outlet.

4. The device of claim 1 wherein said normally constricted openable outlet includes an opening constricted by an expandable diaphragm having a small expandable aperture therein.

5. The device of claim 1 including a means for reciprocatively moving said metering chamber within said reservoir.

6. The device of claim 1 wherein said open ended metering chamber comprises a cylindrical, hollow member reciprocatively mounted to move in and out of said powder reservoir.

7. The device of claim 1 wherein said normally constricted openable outlet includes an opening in said reservoir and a means for maintaining said opening in a normally constricted position, said means being characterized in that it is capable of being opened by a pulse of pressurized fluid and to relax when said pressurized pulse is terminated.

8. The device of claim 1 including a seal mounted to abut said normally constricted outlet.

9. The device of claim 1 including a powder agitating means adapted to fill with powder void areas created within said powder reservoir when powder is removed therefrom by means of the powder metering chamber.

10. The device of claim 9 wherein said agitating means is a vibrator.

11. The device of claim 9 wherein said agitating means is a spring circumscribing a portion of said metering chamber.

12. The device of claim 1 wherein said open ended metering chamber is connected at one of its ends to a pressurized pneumatic line.

13. The device of claim 12 wherein said pressurized pneumatic line includes a solenoid valve means.

14. The device of claim 1 wherein said open ended metering chamber includes a cylindrical housing and a piston circumscribing one end of said metering chamber, said piston being carried within said housing for reciprocating movement.

15. The device of claim 14 wherein said cylindrical housing includes an air receiving chamber at each end thereof.

16. The device of claim 15 wherein a pneumatic line is connected to each of the air receiving chambers for introducing pressurized air therein.

17. The device of claim 1 wherein said open ended metering chamber is frustum shaped.

18. A powder dispensing device comprising:
   a reservoir for storing powder particulates;
   an outlet carried by said reservoir, said outlet having a means for maintaining said outlet in a substantially constricted position to avoid loss of powder therefrom;
   an open ended tubular powder metering chamber mounted for reciprocating movement in said reservoir and through said powder whereby powder is collected in said tubular metering chamber during movement thereof;
   means for reciprocatively moving said open ended tubular powder metering chamber towards said outlet whereby said metering chamber will register with said outlet and be in communication therewith;
   means for introducing a pressurized gas into that end of said metering chamber not in registry with said outlet, said pressurized gas being of sufficient pressure to open said means for maintaining said outlet in a normally constricted position and to eject said powder collected from said powder metering chamber and through said outlet; and
   means for replacing the powder collected within said powder metering chamber when said powder metering chamber is reciprocatively withdrawn from said outlet.

19. The dispensing device of claim 18 wherein said means for maintaining said outlet in a normally constricted position comprises a pressure expandable diaphragm having an opening of sufficiently small size to prevent a substantial passage of said powder therethrough when said diaphragm is in its nonexpanded position.

20. The dispensing device of claim 18 wherein said means for replacing said powder comprises a vibrating device.

21. The dispensing device of claim 18 wherein said means for reciprocatively moving said metering chamber includes a pneumatic piston and cylinder arrangement.

22. The dispensing device of claim 18 including a surge tank for receiving said powder and pressurized gas ejected from said powder metering chamber.

23. A method for ejecting reproducible quanta of powder from a powder reservoir containing powder comprising:
  moving an open ended metering chamber through said powder contained within said powder reservoir so that powder is collected therein;
  introducing a pressurized gas into one end of said metering chamber;
  ejecting said collected powder from said metering chamber into a surge chamber; and
  directing said powder and gas from said surge chamber to a nozzle for distribution thereof.

24. A method for collecting a quanta of powder from a powder reservoir and ejecting same on a heated substrate comprising:
  filling said powder reservoir with a powder;
  passing an open ended powder metering chamber through said reservoir so that one end thereof will receive and collect a reproducible quanta of said powder and continue passing said powder metering chamber through said reservoir until said open end registers with a normally constricted opening contained in said reservoir;
  introducing a pulse of pressurized gas of sufficient pressure so that said normally constricted opening is opened and both said gas and said powder collected in said powder metering chamber are passed therethrough; and
  directing said powder and gas mixture against a heated substrate.

25. An apparatus for spraying the internal walls of a container with a thermoplastic, thermosetting powder comprising:
  a support housing;
  a first and second powder metering and dispensing device mounted on said housing;
  a nozzle attached to an outlet on said first powder metering and dispensing device, said nozzle characterized by its ability to direct a major portion of said powder on the internal walls of said container;
  a second nozzle attached to an outlet on said second powder metering and dispensing device, said second nozzle being characterized by its ability to direct a major portion of said powder on the end wall of said container; and
  means for ejecting pulses of powder from said nozzles.

* * * * *

UNITED STATES PATENT AND TRADEMARK OFFICE
CERTIFICATE OF CORRECTION

PATENT NO. : 3,913,795
DATED : October 21, 1975
INVENTOR(S) : Robert G. Coucher & Edward Taylor It is certified that error appears in the above-identified patent and that said Letters Patent are hereby corrected as shown below:

Col. 1, line 36, change "caan" to --can--;

Col. 3, line 62, change "anad" to --and--;

Col. 3, lines 63 and 64, delete the sentence "It should be noted that this device and its operation will now follow."

Col. 6, line 2, change "onn" to --on--;

Col. 7, line 26, change "aa" to --a--;

Col. 9, line 45, change "combiation" to --combination--.

Signed and Sealed this twenty-fifth Day of May 1976

[SEAL]

Attest:

RUTH C. MASON
Attesting Officer

C. MARSHALL DANN
Commissioner of Patents and Trademarks